United States Patent

[11] 3,584,141

[72] Inventors Tetsuya Fujiwara
Kobe;
Hachiro Omote, Osaka; Katuyoshi Gotou, Ibaragi-shi; Yoshitoyo Kenjo, Suita-shi, all of, Japan

[21] Appl. No. 783,826
[22] Filed Dec. 16, 1968
[45] Patented June 8, 1971
[73] Assignee Matsushita Electric Industrial Co., Ltd. Osaka, Japan

[54] AUTOMATIC TUNING DEVICE FOR TELEVISION RECEIVER
7 Claims, 18 Drawing Figs.

[52] U.S. Cl. .......... 178/5.8A, 331/36 C, 334/15
[51] Int. Cl. .......... H04n 5/50
[50] Field of Search .......... 178/5.8 A, 5.8; 325/67, 470, 422; 331/36 C; 334/15

[56] References Cited

UNITED STATES PATENTS

| | | | |
|---|---|---|---|
| 3,333,215 | 7/1967 | Israel | 334/15 |
| 3,388,215 | 6/1968 | Mayle | 198/5.8 |
| 3,390,228 | 6/1968 | Bell | 334/16 |

*Primary Examiner*—Robert L. Griffin
*Assistant Examiner*—Richard P. Lange
*Attorney*—Stevens, Davis, Miller & Mosher

ABSTRACT: An electronic automatic tuning device for television receivers, wherein in order to enable only a video carrier wave to be tuned in and prevent an audio carrier wave from being tuned in when the received channel is swept by applying an increment of a voltage charged at a capacitor to variable capacitance elements incorporated in the tuner, an input signal resulting from frequency-discrimination of either the video intermediate-frequency signal or the audio intermediate-frequency signal is supplied to an active element for controlling the charging with respect to said capacitor, and the supply of said input signal to said active element is controlled by an element which is adapted to produce switching action with the aid of a signal which is different from said input signal but derived from the same incoming wave.

FIG. 12
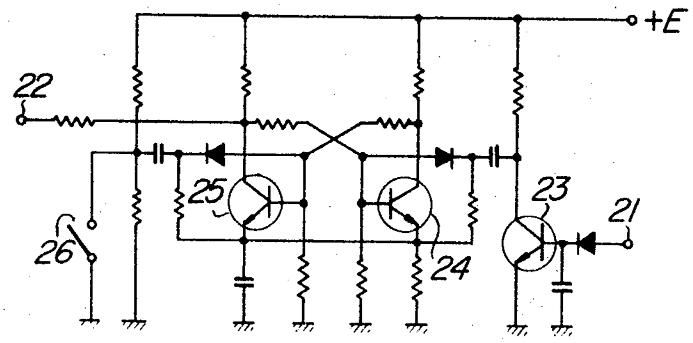
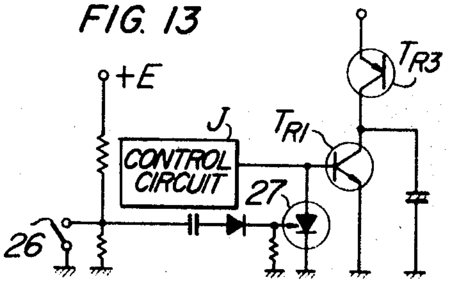
FIG. 14
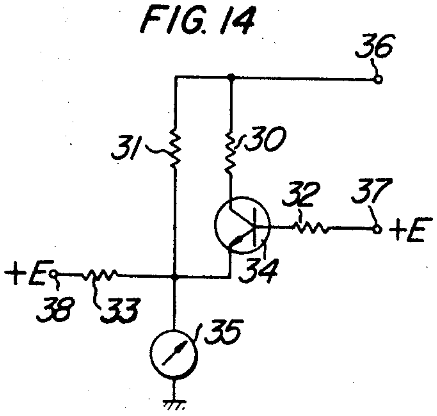
FIG. 15
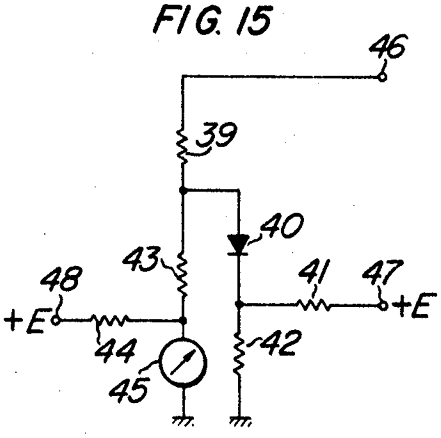

AUTOMATIC TUNING DEVICE FOR TELEVISION RECEIVER

This invention relates to an electronic automatic tuning device for television receivers.

In the conventional receivers, use is made of a rotary type or turret type tuner which is adapted to achieve channel selection by switching the coils or capacitors adapted to be tuned to respective channel signals by turning a selector knob to a predetermined position.

Recently, as a result of the development of variable capacitance elements, there has been proposed a method for selecting a desired channel by changing a voltage applied to a semiconductor variable capacitance element used as the tuning element.

In accordance with the present invention, it is intended to provide a television receiver having a tuner using such variable capacitance elements in the tuning circuit and oscillation resonance circuit (referred to as semiconductor tuner), which is designed so that it is automatically tuned to a desired channel and if it is desired that the presently tuned channel be changed to any other channel, this can promptly be achieved merely by depressing a detuning pushbutton switch. An object of the present invention is to provide an automatic tuning television receiver in which tuned circuits and oscillation circuits of a plurality of tuner sections for various frequency bands are constituted by variable capacitance elements and a selective operation of one of the tuner sections is performed as well as the automatic tuning operation, i.e., automatic channel tuning operation in a selected band.

Another object is to provide a practical arrangement for carrying out the changeover between a plurality of tuner sections operative in individually assigned frequency bands to perform the selective operation of the tuner sections in the automatic tuning television receiver.

Still another object is to provide an automatic tuning television receiver free from adverse effects such as of fading.

A still further object is to provide a means for indicating a channel under reception for use with the changeover means in the automatic tuning television receiver.

Other objects, features and advantages of the present invention will be readily apparent from the following description taken in conjunction with the accompanying drawings.

Figure 9:
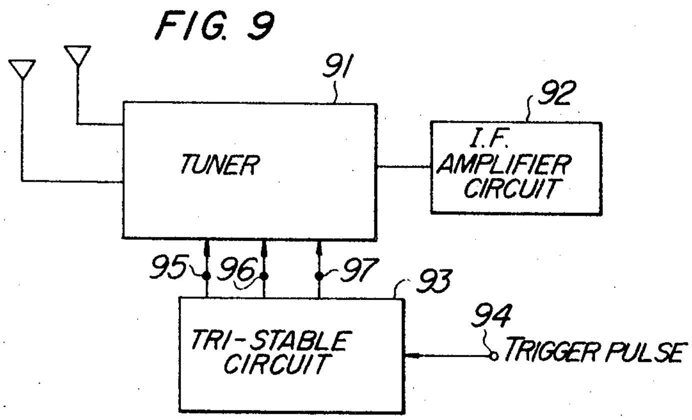
FIG. 9 is a block diagram showing the main portion of the television receiver according to a third embodiment of the present invention.

FIGS. 11*a*, *b*, *c* and *d* show waveforms useful for explaining the operation of the FIG. 9 embodiment, respectively;

FIGS. 12 and 13 are circuit diagrams showing the main portions of the television receivers according to the fourth and fifth embodiments of the invention, respectively; and FIGS. 14 and 15 are circuit diagrams showing the main portions of the television receivers according to the sixth and seventh embodiments of the present invention.

Figure 1:
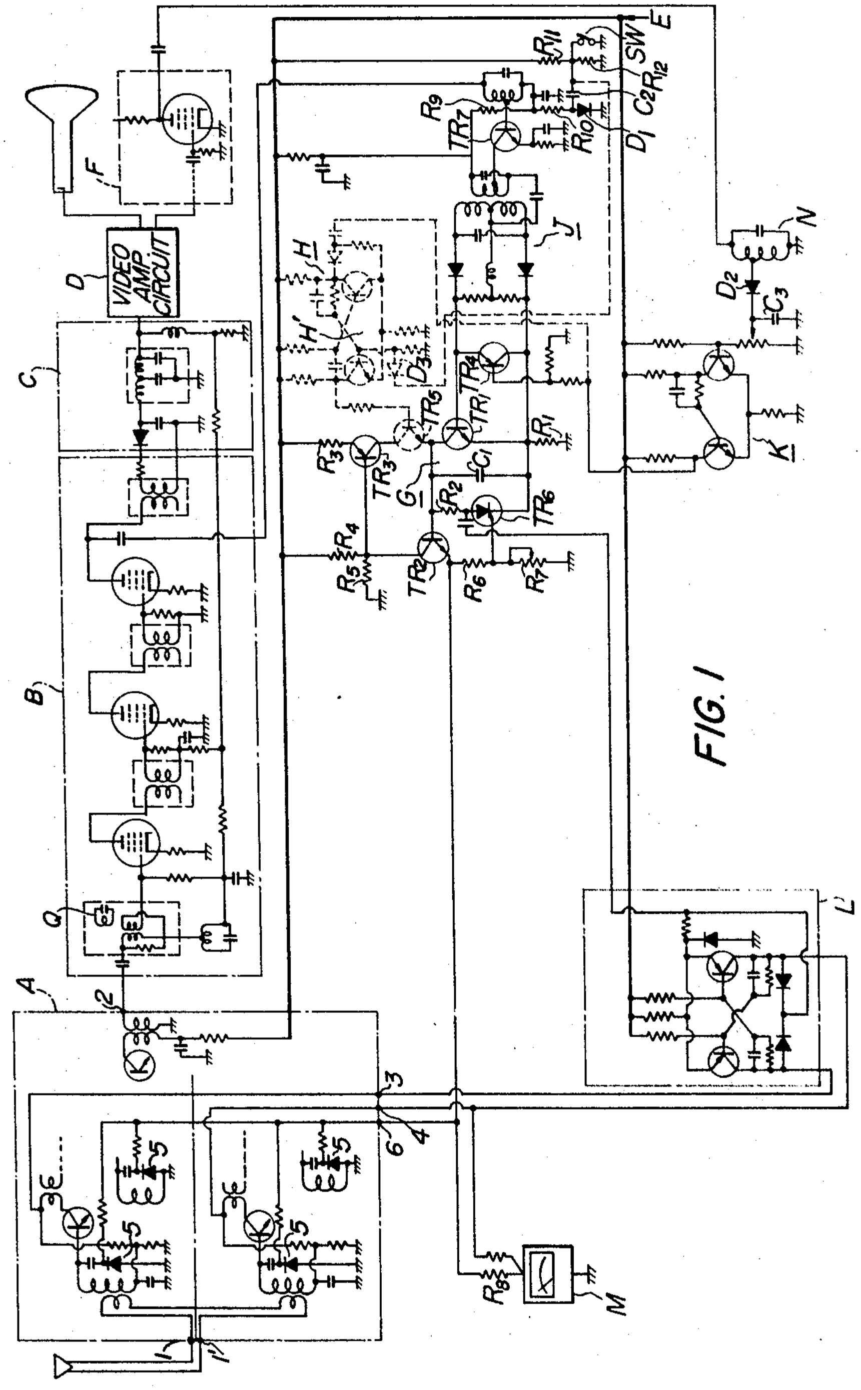
FIG. 1 is a circuit diagram showing the television receiver according to an embodiment of the present invention.

Referring to FIG. 1, there is shown an embodiment of the present invention wherein the portions related directly to the present invention are shown as constituted by transistors and the remaining portions which are not directly associated with the present invention are shown in the form of the conventional circuits constituted by vacuum tubes. A represents a VHF semiconductor tuner having a pair of input terminals 1 and 1. The tuner A is arranged to operate for the "low" band when power is applied to terminal 3 and for the "high" band when power is applied to terminal 4. The reference numeral 5 denotes a semiconductor variable capacitance element to which a voltage is applied through a terminal 6. B, C, D and F indicate an intermediate frequency amplifier circuit, video detector circuit, video amplifier circuit and sync separator circuit, respectively.

G is an applied voltage-generating circuit including $C_1$, $TR_1$ and $TR_3$. H is a monostable multivibrator for short-time storage. J is a circuit of which the output voltage is varied depending upon the intermediate frequency (referred to as control circuit hereinafter).

K is a Schmitt circuit which is employed to shape a signal (referred to as the S signal hereinafter) for discriminating whether a carrier wave which is about to be tuned by the tuner is the video carrier wave of the audio carrier wave. (In the arrangement of FIG. 1, the horizontal sync pulse signal output from the sync separator circuit F is used as the S signal.)

L is a bistable multivibrator circuit for switching the received band, and M an ampere meter for indicating the received channel.

Figure 2:
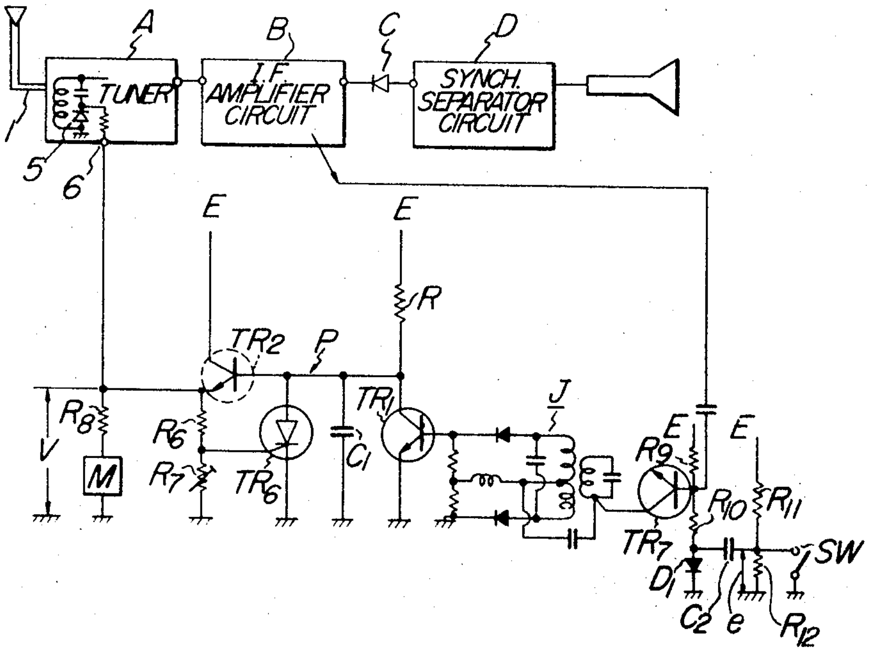
FIG. 2 is a circuit diagram showing the main portion of the circuit shown in FIG. 1.

For the convenience of a detailed description of the operation, only the main portion of the FIG. 1 arrangement is shown in the block diagram in FIG. 2.

At the start of the operation, control transistor $TR_1$ is in the nonconducting state since there is no base input signal. If currents passing to transistor $TR_2$ adapted to function as emitter follower, and to SCR $TR_6$ are neglected, the capacitor $C_1$ is charged with the current from a power source E through a resistor R so that a potential v at point P builds up. Since the transistor $TR_2$ serves as an emitter follower as described above, the base potential can be substantially equal to the emitter potential. Therefore, the potential v at the point P is applied to the variable capacitance element 5 of the semiconductor tuner A via the terminal 6. As a result, the tuned frequency or received frequency increases due to the fact that the capacitance of the variable capacitance element 5 is generally decreased when a voltage is applied thereto. Thus an automatic frequency sweep is effected. (The transistor $TR_2$ is provided in order to prevent the charging current flowing through the resistor R from flowing through the resistor $R_6$ or the indicator M. If the current flowing through the latter two elements can be neglected, then the transistor $TR_2$ can be eliminated).

Assuming that an input electromagnetic wave appears at the terminal 1, then there occurs a point where the frequency of the input electromagnetic wave and the frequency received by the tuner agree, during the buildup of the applied voltage *v*. At that time, the input is converted to the normal intermediate frequency to be fed to the intermediate-frequency amplifier circuit B. Part of the intermediate-frequency signal is taken from the output stage of the intermediate-frequency amplifier circuit to be supplied to the control circuit J through transistor $TR_7$. This intermediate-frequency signal portion may be the audio intermediate-frequency signal (22.25 mc. in the Japanese system), but for the convenience of the present explanation, use will be made hereinafter of the video intermediate-frequency signal. (The point where the signal is taken out is not limited to the output stage of the intermediate frequency amplifier circuit. In extreme cases, such signal may be taken from the output stage of the tuner.) The control circuit J and transistor $TR_7$ constitute a frequency discriminator circuit of which the center frequency is equal to the video intermediate frequency. (It may be equal to the audio intermediate frequency, but for the convenience of explanation, it is assumed that the center frequency is selected to be equal to the video intermediate frequency. The frequency discriminator circuit is arranged to operate so that when the frequency of the input intermediate frequency signal is higher than the center frequency, there is provided an output which is positive with respect to the reference output while when the former is lower than the latter, there is provided an output which is negative with respect to the reference output. In the example of FIGS. 1 and 2, the frequency discriminator circuit is shown as a Foster Seeley circuit, but it may be a ratio detector circuit or a slope detector circuit.

Generally, in a tuner, the local oscillation frequency is selected to be higher than the frequency of an incoming input wave by an amount corresponding to the intermediate frequency, and therefore, as a result of the aforementioned sweep, the frequency of the intermediate frequency signal gradually approaches the center frequency from a lower frequency position and finally becomes higher than the center frequency. Therefore, when the intermediate frequency remains lower than the center frequency, the output of the control circuit is negative with respect to the reference output so that the transistor $TR_1$ remains nonconductive, and when the intermediate frequency is increased to be equal to the center frequency, the output of the control circuit J becomes equal to the reference output so that the transistor $TR_1$ is now rendered conductive. A further sweeping operation results in the intermediate frequency becoming higher than the center frequency so that the output of the control circuit becomes positive with respect to the reference output to drive the transistor $TR_1$ further into the conducting state, with a result that the charging current flowing through the resistor R becomes higher than the current flowing through the transistor $TR_1$. Thus the potential at the point P will be decreased. Such decrease of the potential at the point P results in the reverse sweep so that the intermediate frequency, hence the output of the control circuit is decreased. This is a kind of negative feedback action. A balanced state is attained at a point where the charging current flowing through the resistor R and the discharge current flowing through the transistor $TR_1$ become equal to each other so that the sweep is stopped (this state is referred to as synchronized state). By making the frequency versus output voltage characteristic of the control circuit J sufficiently sharp, it is possible to provide a receiver system adapted for producing the so-called automatic frequency controlling action (AFC action) wherein the balanced state can be maintained at the point where the intermediate frequency agrees with the center frequency, and yet a followup can be completely effected with respect to frequency drift caused by the tuner, irrespective of the frequency or the intensity of an incoming input wave.

$TR_6$ is a switching element such as a silicon-controlled rectifier (SCR) (in the case of a vacuum tube, thyratron), which is rendered nonconductive with a first voltage and conductive with a second voltage. When the potential at the point P builds up to the sweep-terminating point, the element $TR_6$ is rendered completely conductive so as to reduce the potential down to the sweep-starting point. When the potential at the point P is reduced substantially to zero, SCR $TR_6$ is turned off so that the subsequent sweep is initiated. A semifixed resistor $R_7$ is provided for setting up a voltage to cause the breakdown of SCR $TR_6$. In the semiconductor tuner A, the received frequency depends solely upon the applied voltage $v$. Therefore, by constituting a voltage meter by the ampere meter M and multiplying resistor $R_8$ and providing it with a channel scale to make possible channel indication in accordance with the applied voltage $v$, it is possible to construct a received channel indicator. Incidentally, $TR_6$ is shown by way of example as an SCR, but it may be any element that is adapted to breakdown to return the potential at the point P to the original value and thereafter turned off. For example, it may be constituted by a combination of a well-known Schmitt circuit and switching transistor or the like, whereby satisfactory operation can also be achieved.

If it is desired that a certain tuned incoming input wave be changed to a different wave, this can be achieved by restarting the sweep which has been stopped in the balanced state (referred to as "detuning" hereinafter). To this end, there are available a method to supply a signal to forcibly increase the potential at the point P and a method to temporarily stop the transistor $TR_1$ from conduction. FIGS. 1 and 2 illustrate a simple method belonging to the same category as the latter method, wherein a diode $D_1$ is connected in the forward polarity in series with the ground side of a bias circuit $R_9$, $R_{10}$ for the transistor $TR_7$. Voltage drop across the diode $D_1$ can be neglected because it is connected in the forward polarity as mentioned just above. Connected with the connection point between the diode $D_1$ and the resistor $R_{10}$ is a capacitor $C_2$ having the other end connected with a point where there occurs a voltage $e$ divided by resistor $R_{11}$ and $R_{12}$. In the steady state, therefore, the capacitor $C_2$ is charged with the voltage $e$ so that the $TR_7$ is enabled to perform normal operation to thereby maintain the tuned state. At this point, by depressing a "detuning" pushbutton switch SW, the potential at the connection point between the resistors $R_{11}$ and $R_{12}$ is rapidly reduced to zero so that the capacitor $C_2$ is prevented from being rapidly discharged. Thus, the potential at the connection point between the resistor $R_{10}$ and the diode $D_1$ is made negative by the amount of $e$ so that the transistor $TR_7$ is turned off. As a result, the transistor $TR_1$ is rendered nonconductive, and thus the sweep is initiated. Consequently, a current is caused to pass to the capacitor $C_2$ through the resistors $R_9$ and $R_{10}$, and after the lapse of a certain period of time corresponding to the time constant defined by the resistors $R_9$ and $R_{10}$ and capacitor $C_2$, the potential at the connection point between the diode $D_1$ and the resistor $R_{10}$ is reduced substantially to 0 volt so that the transistor $TR_7$ is again rendered conductive. In this way, the condition for the subsequent tuning operation is established. With such circuit arrangement, it is required that the "detuning" push button switch SW be closed for a longer period of time than that during which the transistor $TR_7$ remains nonconductive. As a result of experiments, it has been found that the values for the resistors $R_9$ and $R_{10}$ and capacitor $C_2$ may be selected so that the transistor $TR_7$ remains nonconductive for 0.2 sec. or less. Naturally, the sweep velocity should be so selected that during the nonconductive period of the transistor $TR_7$, hence $TR_1$, departure from the tuning range for the previously tuned incoming input wave is completed and yet the tuning point for the subsequent incoming input wave is not past. Further, by using a monostable multivibrator circuit in the pulse generating portion which is employed to render the transistor $TR_7$ nonconductive, it is possible to set the nonconductive period independently of the closed period of the switch SW.

In the foregoing, description has been made of the outline of the operation. At this point, the following items should be considered.

1. An actual television signal wave includes a video carrier wave and a audio carrier wave. With the foregoing arrangement, both the video carrier wave and the audio carrier wave tend to be tuned in. Assume that the condition where the video carrier wave is converted to a normal video intermediate frequency is the normal condition. Then, it is necessary to prevent such an abnormal condition that the audio carrier wave is converted to the normal video intermediate frequency.

2. The allotment of television wave bands is as follows:

In the Japanese system,

| | | |
|---|---|---|
| Ch. 1—3 | 90 Mc.—108 Mc. | Low band |
| Ch. 4—12 | 170 Mc.—222 Mc. | High Band |

In the U.S. system,

| | | |
|---|---|---|
| Ch. 2—6 | 54 Mc.—88 Mc. | Low band |
| Ch. 7—13 | 174 Mc.—216 Mc. | High band |

The UHF band is as follows:

In the Japanese system, Ch. 13—62 470 Mc.—770 Mc.

In the U.S. system, Ch. 14—83 470 Mc.—890 Mc.

Therefore, in case an attempt is made to receive all the channels by using a variable capacitance element without switching the coils, the ratio of the minimum tuned frequency to the maximum tuned frequency becomes as follows:

In the Japanese system, 90 : 770

In the U.S. system, 54 : 890

Obviously, however, it is almost impossible to achieve such ratios merely with the aid of capacitance variations of the variable capacitance element. It is not preferable to effect the sweeping operation or receiving operation with respect to the frequency band between the "low" and the "high" band or that between the "high" and the UHF band since these intermediate bands are not related to television. Therefore, it is wise to make division for each receiving band described above. Thus, the following relation can be obtained $$C \alpha 1/f^2$$

from the following formula giving a parallel resonance frequency $f$ in terms of the inductance value $L$ of a coil and the capacitance value $C$ of a condenser $$f=1/2\pi\sqrt{LC}$$

From this, the ratio of the minimum to the maximum value of the tuning capacitance for each band can be set up as follows:

In the Japanese system,

| | |
|---|---|
| Low band | $1/90^2: 1/108^2 =: 1/1.44$ |
| High band | $1/170^2 : 1/222^2 =: 1/1.7$ |
| UHF band | $1/470^2: 1/770^2 =: 1/2.68$ |

In the U.S. system,

| | |
|---|---|
| Low band | $1/54^2: 1/88^2 =: 1/2.65$ |
| High band | $1/174^2: 1/216^2 =: 1/1.54$ |
| UHF band | $1/470^2: 1/890^2 =: 1/3.58$ |

These ratios can easily be achieved. Thus, the semiconductor tuner A should be so designed that band switching can be purely electronically performed by applying a voltage to a particular terminal as described above and upon completion of the sweep the presently tuned band can be automatically switched to the next band.

3 As will be readily deduced from the aforementioned operational principle, if the incoming input wave is interrupted or weakened due to fading, noise or some other causes so that the synchronizing signals become absent, then the possibility occurs that the balanced condition is destroyed so that the sweep is restarted to change the presently tuned channel. In order to prevent this, the tuned state should be maintained for a short period of time even if such condition has occurred. For this purpose, it is necessary to provide other special means. (This will be referred to as short-time storage. However, it is not always necessary to provide such means).

Of the above three items, the discrimination described in item (1) can be made according to whether the video signal detected by the video detector circuit C is supplied to the video amplifier circuit D. The circuit shown in FIG. 1 is constructed on the basis of this fact, and the explanation concerning FIG. 2 applies directly to FIG. 1. If the detection output detected in the detector C is a video signal which contains synchronizing signals, then such synchronizing signals appear in the sync separator circuit F, and pulses of which the repetition rate corresponds to the horizontal frequency appear at the horizontal sync signal output tube. In the abnormal tuning state, no detection output is obtained by detecting the envelope of the audio intermediate frequency signal since the latter is frequency-modulated. Thus it is possible to discriminate whether the tuned state is normal or abnormal according to whether the horizontal sync signal output is present or absent at the sync separator circuit. A signal available from the plate (or grid) of the horizontal sync signal output tube is converted substantially to a DC signal with the aid of diode $D_2$ and condenser $C_3$. If the resulting DC signal exceeds a predetermined value, then Schmitt circuit K is operated to turn off a switching transistor $TR_4$ inserted between the output terminals of the control circuit J. The transistor $TR_4$ being turned off, the output of the control circuit J is allowed to be fed to the base of the transistor $TR_1$ to determine the operational state of the latter to effect a tuning operation of the tuner. However, in the abnormal tuned state, since no synchronizing signals are available, no output is provided by the diode $D_2$ so that the Schmitt circuit K remains inoperative. At this time, the switching transistor $TR_4$ is rendered conductive so that the output of the control circuit J is not passed to the transistor $TR_1$. Thus, the sweep is continued, eliminating the possibility that the audio carrier wave is tuned. N is a resonance circuit which is adapted to resonate at the basic wave of the horizontal repetition frequency. This resonance circuit is provided for the purpose of eliminating the noise component. Furthermore, the Schmitt circuit K is provided to surely perform the operation, wherein the output of the diode $D_2$ may be connected directly with the transistor $TR_4$.

In the foregoing, description has been made of the case where an S signal is obtained from the output of the sync separator circuit. It is also possible that part of the intermediate frequency signal may be taken out from an intermediate portion of the intermediate frequency amplifier circuit B so as to be detected through a selector circuit which is adapted to pass only the video carrier wave frequency, and that the detection output may be connected directly with the transistor $TR_4$ as is the case with the output of the aforementioned diode $D_2$.

Alternatively, the S signal can be discriminated according to whether a signal corresponding to the audio intermediate frequency is present in addition to the video component in a certain tuned state. In the normal tuned state, the audio intermediate frequency always occurs at a position lower by 4.5 Mc. than the video intermediate frequency (in both of the Japanese and U.S. systems). Therefore, a signal corresponding to the normal audio intermediate frequency may be taken out of the intermediate frequency amplifier circuit B in the narrow band, rectified to be converted to an S signal and then connected with a stage after said diode $D_2$. This method can easily be performed with a standard type television receiver. In the case of an inter-carrier type television receiver, the audio intermediate frequency is considerably attenuated by an audio IF trap in the stage after the intermediate frequency amplifier circuit. Therefore, the signal corresponding to the normal audio intermediate frequency is subjected to a narrow band-amplifier after having been taken out of the audio IF trap Q, the output stage of the tuner or the stage after the intermediate frequency amplifier circuit. This method is advantageous over the aforementioned method based on the presence or absence of synchronizing signals in that there is no possibility that an erroneous operation will be caused due to noise or cross-modulation, although it is slightly more complicated than the latter method.

Figure 4:
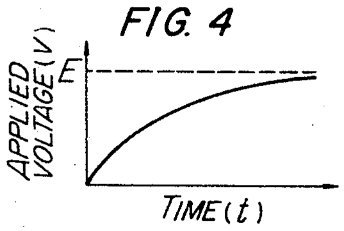
FIGS. 4, 5, 6, 7 and 8 are views showing characteristic curves useful for explaining the operation of the television receiver embodying the present invention, respectively.

Description will now be made of the sweep voltage waveform. In the circuit arrangement shown in FIG. 2, the power source E charges the capacitor $C_1$ through the resistor R so that the potential or $v$ at the point P is represented by a well-known CR charging curve as shown in FIG. 4. Here, the capacitance $C_P$ of the semiconductor variable capacitance element is generally given by $$C_P = kv^{-n} \quad (1)$$

$k, n$: constant

Assuming that an inductance of $L$ is connected in parallel with $C_P$, then the tuned frequency $f$ is given by $$f = \frac{1}{2\pi\sqrt{LCP}} = \frac{1}{2\pi\sqrt{kL}} v^{\frac{n}{2}} = Kv^N \quad (2)$$

$K, N$: constant

Figure 3:
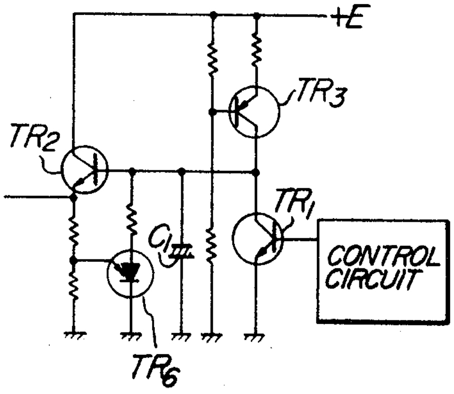
FIG. 3 is a circuit diagram showing the main portion of the television receiver according to a second embodiment of the present invention.
Figure 5:
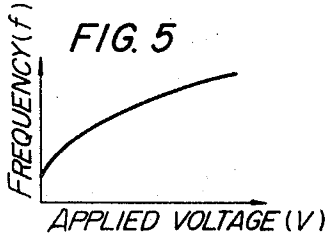
Figure 6:
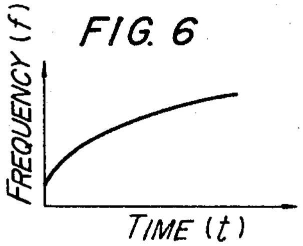
Figure 7:
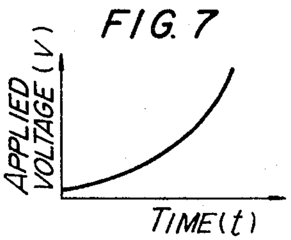
Figure 8:
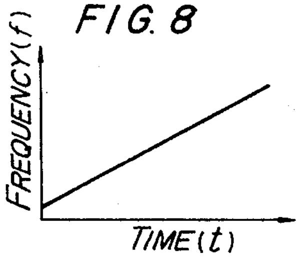

From this, it will be seen that the tuned frequency is generally represented by such a curve as shown in FIG. 5. FIG. 6 shows the relationship of the frequency $f$ to time $t$ which is sought from FIGS. 4 and 5, from which it will be seen that the frequency width per unit time differs. This means that it is necessary to change the pulse width for the "detuning" in accordance with the frequency. Also, this means that a very long time is required to achieve "detuning" in a higher frequency range. A method of avoiding this is to effect constant-current charging by using a sufficiently high voltage source as E and a sufficiently high resistance as R. In the case of a vacuum tube type receiver, such charging current may be taken from the B power source, and in the case of a transistorized receiver, it may be taken from power supply line at about 100 V. By using such a constant-current circuit as shown in FIG. 3, it is possible to make the relationship shown in FIG. 4 substantially linear without resorting to a high power source. However, it is still required that the "detuning" pulse width be varied in accordance with the frequency The circuit shown in FIG. 1 is arranged to eliminate the necessity to change the pulse width as described above. wherein the transistor $TR_3$ is used instead of the resistor $R_1$ and charging current $i$ flowing through the transistor is made proportional to the applied voltage $v$ (Such a method of making the charging current $i$ proportional to the applied voltage $v$ will be referred to as the proportional current sweep method thereinafter). In this way, the relationship between time $t$ and voltage $v$ is as shown in FIG. 7 wherein the curve representing such relationship is curved in the direction opposite to the curve of FIG. 5. Thus, the relationship between time and frequency is made to be substantially linear as shown in FIG. 8. Further detailed description will now be made of such relationship. Being proportional to the applied voltage $v$, the charging current $i$ is given by $$i=A\ v \quad (3)$$

$A$ : proportional constant

From this, $$v=\frac{1}{C_1}\int Avdt \quad (4)$$

$$=\epsilon\frac{A}{C_1}t \quad (5)$$

The frequency tuned by the tuner is given by Equation (2), and therefore $$\log =N\log v+K' \quad (6)$$

$K'$ : constant

In actuality, however, the frequency is changed twice at most, and therefore it can be considered that the following equation holds true:

$$=a\log v+b \quad (7)$$

$a, b$ : constant

From Equations (5) and (7), the following equation is obtained:

$$=a\ A/C_1\epsilon\times At+b \quad (8)$$

Thus, the relationship between $t$ and is reduced to a linear function. This proves that the relationship of FIG. 8 becomes linear, and means that the frequency change per unit time resulting from the sweep remains constant. Advantageously, therefore, the "detuning" pulse width may be constant.

Description will be made of the receiving band switching operation. As previously mentioned, in the case of a VHF receiver, band switching is required to be effected between the two, "low" and "high", bands, and in the case of an all-channel receiver, such switching is required to be effected among three bands including the UHF band in addition to the two VHF bands. FIG. 1 shows the arrangement for a VHF receiver, wherein the tuner A which is provided with one pair each of input terminals and output terminals is adapted to operate for the "low" band when a voltage is applied to the terminal 3 and for the "high" band when a voltage is applied to the terminal 4. In such arrangement, a voltage is alternatively applied to the terminals 3 and 4 each time one sweep is completed, and since the switching is effected between the two bands, the bistable multivibrator circuit is connected as shown in FIG. 1. As trigger for the bistable multivibrator, use can be made of a transient voltage which is developed across the resistor $R_2$ when the charge at the capacitor $C_1$ is discharged by the SCR $TR_6$ when one sweep is returned from the terminating point to the starting point.

Figure 10:
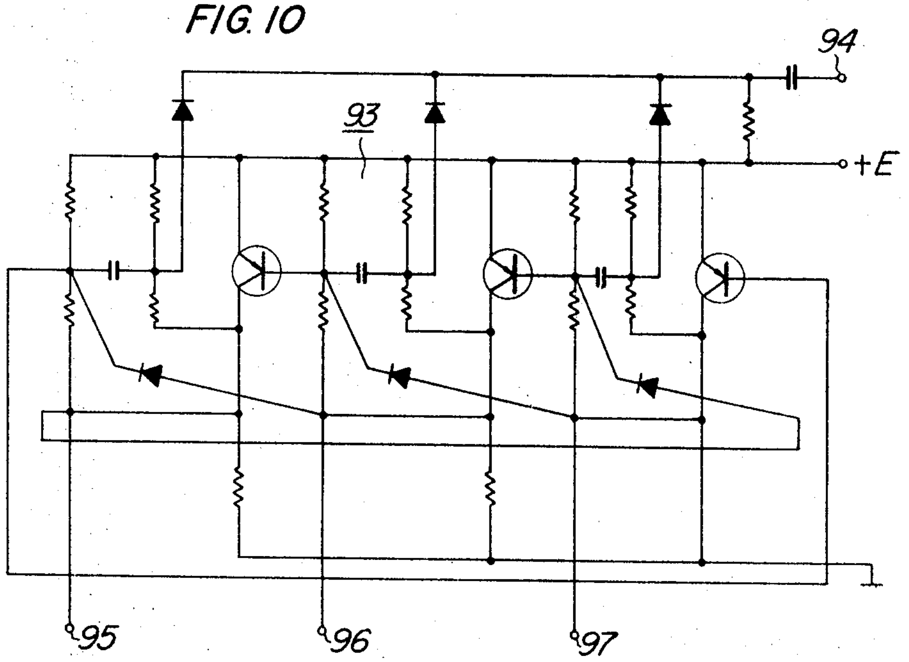
FIG. 10 is a circuit diagram showing a tristable circuit which can be used for the television receiver embodying the present invention.
Figure 11:
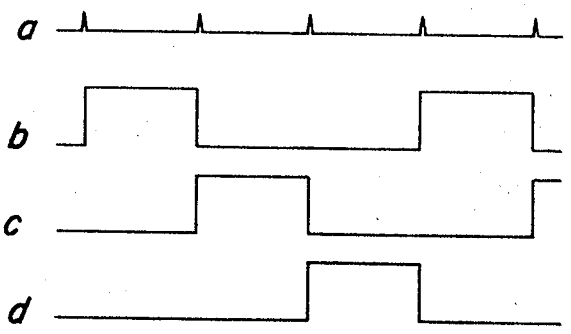

In the case of an all-channel receiver, it may be considered that three such tuner portions are provided. FIG. 9 shows the arrangement for such a receiver. In FIG. 9, the reference numeral 91 represents a tuner, 92 an intermediate frequency amplifier circuit, 93 a tristable circuit, 94 a trigger pulse input terminal, and 95, 96 and 97 terminals for the UHF, "high" and "low" bands respectively. An example of the tristable circuit 93 is shown in FIG. 10. As trigger pulses, use is made of transient voltage pulses resulting from current flowing through the SCR $TR_6$ upon completion of each sweep, and a voltage appearing at each of the three terminals is applied to the terminal of the tuner to thereby effect band switching. The output of the tristable circuit 93 is shifted as shown in FIG. 11 every time a trigger pulse is applied thereto, and thus the receiving band can be switched in the order of "low," "high" and "UHF." In FIG. 11, $a$ shows the trigger pulses applied to the terminal 94, $b$ shows the voltage waveform occurring at the terminal 95, and $c$ shows the voltage waveform occurring at the terminal 96. Description will now be made of the short-time storage. One of the basic problems with an automatic tuning device of such sweeping type arises from the premise that a stable wave arrives without interruption. As will be easily deduced from the foregoing description concerning the operational principles, with such device, the possibility occurs that detuning is caused by a very short-time interruption of the incoming wave, attenuation (due to fading of the like) or noise equivalent thereto, decrease in the modulation degree of the video signal, very short-time interruption of the synchronizing signals, or etc. As a result, the presently tuned channel tends to be changed to the next channel completely against the will of the person who watches television. Such trouble can be avoided by the short-time storage action described in the above item (3). The portion H indicated by dotted lines in FIG. 1 is the circuit provided for this purpose. During the sweeping and tuning operation, switching transistor $TR_5$ remains conductive so as to have no effect on the operation. The transistor $TR_5$ is controlled by the monostable multivibrator circuit H' so that it is turned off when the multivibrator H' is operated by being triggered, and turned on when the multivibrator is returned to the original state after the lapse of a period of time determined by the time constant of its own. The monostable multivibrator H' is so designed as to be triggered when the discriminating signal is interrupted or weakened. In the example shown in FIG. 1, the Schmitt circuit K is supplied with the S signal which is derived from the horizontal sync signals available from the sync separator circuit and converted to a direct current through the narrow-band circuit. During the operation of the Schmitt circuit K, the monostable multivibrator is not influenced, while when the Schmitt circuit K is stopped from operating, the monostable multivibrator H' is triggered by resulting transient pulses, so that the switching transistor $TR_5$ is thereby rendered nonconductive. With such an arrangement, since the transistor $TR_5$ is initially turned on, the sweep can be started without any difficulty so that a wave of a certain channel can be tuned in. Suppose that the output of the diode $D_2$ is decreased due to some cause in the tuned state. Then detuning will be caused in the absence of the transistor $TR_5$ and monostable multivibrator H', i.e., in the absence of the short-time storage circuit. In the presence of such storage circuit, on the other hand, the operation of the Schmitt circuit K is interrupted due to the decrease in the output of the diode $D_2$. Thus, the monostable multivibrator H' is triggered by a transient pulse provided by the Schmitt circuit, so that the transistor $TR_5$ is turned off, thus preventing the sweep from being performed. There is of course the possibility that the condenser $C_1$ is discharged by the transistor $TR_1$ even if the transistor $TR_5$ is turned off, since the balance current was flowing through the transistor $TR_1$ in the tuned state. However, there is no discharge path for the charge at the capacitor $C_1$, because the Schmitt circuit K has already been stopped from operating so that the switching transistor $TR_4$ provided in the control circuit J is turned on to thereby render the transistor $TR_1$ nonconductive. Hence, the original tuning point will be maintained until the monostable multivibrator H' is returned to the original state. If the signal wave is recovered within the period of time during which the original tuning point is so maintained, the applied voltage remains the same so that the intermediate frequency signal is produced without hindrance also be produced. Thus, the Schmitt circuit K is operated. The switching transistor $TR_4$ is turned off, and the operation of the monostable multivibrator H' is completed after the control operation of the transistor $TR_5$ is initiated, and then the transistor $TR_5$ is turned on. Thus, the short-time storage is maintained without failure. Unfortunately, however, if the incoming wave is recovered after the monostable multivibrator H has been returned to its original state, then this will be the case that the sweep is restarted whereby detuning is caused so that a next channel is tuned in. In actuality, however, the incoming input wave is rarely interrupted longer than several seconds, and therefore the pulse width of the monostable multivibrator H' or the storage time of the short-time storage circuit may be several seconds at maximum from the standpoint of practical use. Such storage time can easily be achieved. During the operation of the monostable multivibrator H', the transistor $TR_5$ remains nonconductive, and therefore "detuning" can not be achieved by depressing the pushbutton switch SW. In order to eliminate such drawback, diode $D_3$ is connected between the connection point between resistors $R_{11}$ and $R_{12}$ and the base of the poststage transistor of the monostable multivibrator H'. When the pushbutton switch SW is depressed, the cathode of the diode $D_3$ is made to assume the earth potential so that the monostable multivibrator H' is stopped from operating irrespective of the operating time thereof. Thus, the transistor $TR_5$ is immediately rendered conductive to thereby achieve the detuning operation.

In the foregoing, description has been made of a method for achieving detuning by temporarily blanking the transistor $TR_7$ for a predetermined period of time. Although this method is advantageous in that it is simple and inexpensive, it has such a drawback that erroneous operation is caused if either the sweep velocity or the said predetermined period of time (referred to as blanking period hereinafter) is changed from the designed value due to some cause (transient change, for example) since there is a critical relationship between the blanking period and the sweep. Another great problem with the foregoing method is that the blanking period should be changed when the frequency band is switched since although the blanking period may remain the same for the same frequency band, the sweep frequency band corresponding thereto becomes greatly different among the "low," "high" and "UHF" bands. This makes the arrangement complex and causes erroneous operation. From the foregoing, it will be seen that the method illustrated in FIG. 1 seems to be simple but it is not very practical. In order to solve the above problems, the following method is proposed wherein the blanking period is changed in accordance with the sweep velocity. The basic principle of this method is as follows: By depressing the detuning switch, the input is prevented from being applied to the base of the control transistor $TR_1$ to prevent the tuning operation from being performed so that the sweep is continued, thus permitting detuning to be achieved. When the received signal wave is detuned, the control signal and discriminating signal become extinct. Upon arrival of the next incoming wave, these control and discriminating signals are again generated. Thus, by detecting the extinction or generation of the control signal or discriminating signal, input is applied to the base of the control transistor $TR_1$ so that the receiver is returned to the state where tuning can be achieved. Since the detuning operation continues until the presently tuned wave is completely detuned or until the next signal wave arrives, the blanking period corresponding to the sweep velocity can automatically be set, without specially considering them.

FIG. 12 shows an example of the arrangement wherein the generation of the discriminating signal is detected, and FIG. 13 shows an example of the arrangement wherein the extinction of the control signal is detected.

In FIG. 12, the discriminating signal is supplied to a terminal 21, and a terminal 22 is connected with the switching transistor $TR_4$ shown in FIG. 1. When the discriminating signal is supplied to the terminal 21, the potential at the collector of the transistor 23 is changed from 0 to +E, and this potential variation is differentiated so that a negative pulse is applied to a transistor 24. Thus, a bistable multivibrator 25 constituted by transistors 24 and 25 is made to assume the "ON" or stable state. At this point, no voltage appears at the terminal 22 so that the switching transistor $TR_4$ is rendered nonconductive, and therefore the device is in a state in which tuning can be achieved. That is, upon generation of the discriminating signal, the device will be able to achieve tuning so as to be tuned to a video carrier wave. Subsequently, by depressing a switch 26, a negative pulse is produced which is in turn applied to the transistor 25 so that the bistable multivibrator is made to assume another stable state. As a result, a positive voltage occurs at the terminal 22 to render the transistor $TR_4$ conductive. Thus, the device is caused to assume a state in which tuning cannot be achieved, and the sweep is started so that the presently received signal wave can be detuned. Upon arrival of the next incoming signal wave, the discriminating signal is generated to repeat the foregoing operation. In this way, reception can be achieved.

Referring to FIG. 13, a control switching element (SCR or the like) 27 is provided between the control circuit J and the base of the control transistor $TR_1$. This control switching element is adapted so that when it is once turned on, it remains turned on so long as a voltage is present between the anode and the cathode thereof and when the voltage becomes absent, it is turned off. In the receiving state, a positive voltage available from the control circuit J is applied to the base of the control transistor $TR_1$. In an attempt to cause detuning, the switch 26 is depressed. Thereupon, a positive pulse is imparted to the gate of the control switching element 27 to render the latter conductive so that the input to the base of the $TR_1$ is interrupted. Thus, the sweep is restarted, and when the presently received signal wave is detuned, the positive voltage from the control circuit J becomes absent so that the control switching element 27 is rendered nonconductive to thereby permit reception.

In the foregoing, the present automatic tuning circuit has been described in detail. Finally, description will be made of the tuning indication (indication of received channel). The tuned frequency depends solely upon the applied voltage $v$, and therefore such indication can be effected by the use of an indicator adapted to produce indication in accordance with voltage and provided with a channel scale. However, in case the frequency band is divided into two or three, then the channel scale should be double or triple, and therefore this makes it difficult for a user to read the scale. FIG. 1 shows by way of example the case where the frequency band is divided into two sections. As indicator M, a DC ampere meter is used, and multiplying resistor $R_8$ is so selected that a current which is half that corresponding to the full scale of the indicator is caused to flow therethrough at the maximum voltage point in the "low" band. "High" band power source supply terminal 4 of the frequency band switching bistable multivibrator L is connected with the indicator through a resistor so that a current is caused to flow through the indicator while being superimposed upon said current. In this case, the resistor is so selected that the superimposed current becomes substantially equal to that flowing at the maximum voltage point in the "low" band. With such arrangement, the "low" band is indicated on the first half of the full scale of the indicator, and the "high" band on the last half thereof. Thus, conveniently, there can be obtained a uniform scale indicating both the "low" band and the "high" band.

In the case where the frequency band is divided into three sections, a single scale may be divided into three sections each of which corresponds to 1/3 of the full scale in the same manner as described above. However, in accordance with the general idea of television, it is commonly considered that the "low" and "high" bands belong to the common VHF band and are not to be separated from each other, and that the UHF band is different from the VHF. The total number of channels in the VHF band including the "low" and "high" bands is 12, and that in the UHF band is much greater than that. For the above reason, it is preferably from the practical point of view that the whole VHF band is indicated on a single scale and the UHF on another single scale. To this end, it is required that the circuitry be set up so that the voltage sensitivity of the volt meter ($R_8$ and M) with respect to the UHF band becomes twice as high as that with respect to the VHF band. Such requirement can be met either by making the value or the multiplying resistor $R_8$ during the UHF reception to be one half of that during the VHF reception or making the current sensitivity of the ampere meter M during the UHF reception twice as high as that during the VHF reception. FIG. 14 shows the former case, and FIG. 15 shows the latter case.

In FIG. 14, a voltage is applied to a terminal 36. A terminal 38 is connected with the "high" band power source supply terminal of the tristable circuit, and a terminal 37 is connected with the UHF band power source supply terminal. For "low" band indication, no voltage is applied to the terminals 37 and 38, and therefore the voltage applied to the terminal 36 is imparted to an ampere meter 35 through a resistor 31. In order to be able to indicate both the "low" band and the "high" band on a single scale, the value of the resistor 31 is so selected that the meter points to half the full scale at the maximum voltage point in the "low" band. For "high" band indication, a voltage of +E is applied to the terminal 38 and then to the ampere meter 35 through the resistor 33 so that the meter points to half of the full scale. Thus, indication of the "-high" is superimposed upon that of the "low" band. When the UHF band is to be indicated, no voltage is present at the terminal 38, and the voltage +E occurs at the terminal 37. This voltage is applied to the base of the transistor 34 through the resistor 32 to render the transistor conductive. At this point, a current is caused to flow through the ampere meter 35 via the parallel resistors 31 and 30. By previously making the values of the resistors 31 and 30 equal to each other, the voltage sensitivity of the meter 35 with respect to the UHF band can be made twice as high as that with respect to the VHF band, and the meter is enabled to point to the full scale at the maximum voltage point.

In FIG. 15, terminals 46, 47 and 48 correspond to the terminals 36, 37 and 38 of FIG. 14, respectively. When the "low" band is to be indicated, a voltage applied to the terminal 46 causes a current to flow through the resistor 39 and to be passed both to a resistor 43, ampere meter 45 to and a diode 40, resistor 42. The resistors are selected so that the resistances of the respective shunt paths become equal each to other and the meter points to half of the full scale at the maximum voltage point. When the "high" band is to be indicated, a voltage of +E is imparted to the terminal 48 to cause a current to flow through the ampere meter 45 via resistor 44. By selecting the resistor 44 so that the meter 45 is enabled to point to half the full scale, it is possible to indicate the "high" band over the first half of the scale of the ampere meter. When the UHF band is to be indicated, the voltage of +E is applied to the terminal 47 to reversely bias the diode 40 through the resistor 41. In this case, a current flowing through the resistor 39 is caused to flow in only the ampere meter 45. Since the resistances of the shunt paths are selected to be equal to each other as mentioned above, the current flowing through the ampere meter 45 becomes twice as high as that during the VHF band indication so that the meter is caused to point to the full scale at the maximum voltage point. The resistor 43 may be removed, and in that case, the internal resistance of the ampere meter 45 should be high so that the voltage difference between the terminals thereof is so high as to render the diode 40 sufficiently conductive.

We claim:

1. An automatic tuning television receiver of the type having a plurality of tuner sections responsive to frequencies of individual predetermined frequency bands, said tuner sections including tuning elements and frequency generating elements having variable capacitance elements, comprising, in combination: a sweeping means including a capacitance device operatively associated with said variable capacitance elements, said sweeping means sweeping the receiving frequencies of each of said tuner sections in accordance with the charged voltage of said capacitance device; a switching means for instantaneously discharging said capacitance device when said capacitance device completes one cycle of sweeping operation; an active element connected in parallel with said capacitance device for controlling the terminal voltage of said capacitance device depending upon the operating state of said active element; a frequency discriminator circuit for controlling the operating state of said active element; means for supplying said discriminator circuit with the video intermediate frequency signal of a television signal; and means for consecutively actuating said tuner sections one after another in response to the operation of said switching means.

2. An automatic tuning television receiver as set forth in claim 1, wherein said circuit means comprises a multivibrator having a plurality of stable states.

3. An automatic tuning television receiver as set forth in claim 2, wherein said tuner sections comprise a high frequency band tuner section and a low frequency band tuner section alternatively actuated by a bistable multivibrator.

4. An automatic tuning television receiver as set forth in claim 3, further comprising an indicator associated with said capacitance device and with said bistable multivibrator in such a manner that during the low frequency band sweeping operation the reading of said indicator is no greater than half of the full scale of said indicator, and means supplying a signal voltage obtained from the inversion of the stable state of said bistable multivibrator during the high frequency band sweeping operation to said indicator whereby the reading of said indicator is larger than half of the full scale of said indicator.

5. An automatic tuning television receiver as set forth in claim 2, wherein said tuner sections comprise a VHF high frequency band tuner section, a VHF low frequency band tuner section and a UHF band tuner section consecutively actuated one after another by a tristable multivibrator.

6. An automatic tuning television receiver as set forth in claim 5, further comprising an indicator associated with said capacitance device and with said tristable multivibrator in such a manner that during the VHF low frequency band-sweeping operation the reading of said indicator is no greater than half of said indicator; means supplying a signal voltage obtained from a first inversion of the stable state of said tristable multivibrator during the VHF high band-sweeping operation to said indicator, whereby the reading of said indicator is larger than half of the full scale of said indicator; and means supplying a signal voltage obtained from a second inversion of the stable state of said tristable multivibrator during the UHF band sweeping operation to said indicator, whereby the sensitivity of said indicator is twice that during the VHF band-sweeping operation to effect a full scale indication.

7. An automatic tuning television receiver as set forth in claim 1, further comprising gate means connected with said capacitance device to charge said capacitance device through said gate means; and a monostable multivibrator circuit connected with said gate means to on-off control the latter, said monostable multivibrator operable to deliver an output signal in response to a decrease in the intensity of a signal wave under reception and in response to an input signal fed to said monostable multivibrator by a manual operation.

PO-1050
(5/69)

UNITED STATES PATENT OFFICE
CERTIFICATE OF CORRECTION

Patent No. 3,584,141 Dated June 8, 1971

Inventor(s) Tetsuya Fujiwara et al

It is certified that error appears in the above-identified patent and that said Letters Patent are hereby corrected as shown below:

In column 12, line 16, insert -- circuit -- before "means".

Signed and sealed this 9th day of May 1972.

(SEAL)
Attest:

EDWARD M.FLETCHER,JR.
Attesting Officer

ROBERT GOTTSCHALK
Commissioner of Patents